United States Patent Office 3,525,691
Patented Aug. 25, 1970

3,525,691
SOLID LUBRICANT COMPOSITIONS EMPLOYING POLYBENZOTHIAZOLE RESINS AND LUBRICATING PIGMENTS
Bobby D. McConnell, Dayton, Ohio, assignor to the United States of America as represented by the Secretary of the Air Force
No Drawing. Filed Mar. 22, 1968, Ser. No. 715,162
Int. Cl. C10m 5/22, 5/20, 5/02
U.S. Cl. 252—25
10 Claims

ABSTRACT OF THE DISCLOSURE

Solid lubricant compositions employing polybenzothiazole resins and lubricating pigments are produced by admixing finely divided lubricant pigments into a solution of polybenzothiazole resin and solvent therefor. For example, a solid lubricant composition is produced by dissolving powdered polybenzothiazole in dimethylacetamide to form a solution of about 25 weight percent solids to which is added 7 weight percent zinc oxide and 68 weight percent of the solid lubricant pigment comprising a mixture of molybdenum disulfide ($MoS_2$) and antimony trioxide ($Sb_2O_3$). The resulting slurry is sprayed onto the surface of a test specimen and the wetted test specimen is placed into an oven where it is dried at 200° F. for one hour. It is then heated at 600° F. under nitrogen for one hour to effect crosslinking and bonding to specimen surface. Other solid lubricant pigments which may be used include molybdenum diselenide, graphite, tungsten disulfide, tungsten diselenide and the like.

Alternatively, the polybenzothiazole composition can be laminated with fibers of glass, graphite and the like to make preformed structures which can be machined to fit against the metal surface to be lubricated. Fiber glass on graphite fiber reinforced bearing components are formed utilizing the polybenzothiazole composition as a binder for the fibers as well as for the lubricating pigment.

The invention herein described may be manufactured and used by or for the United States Government for government purposes without payment to me of any royalty thereon.

BACKGROUND OF THE INVENTION

This invention deals with solid film lubricant compositions and more particularly is directed toward bonding agents with improved properties for use with solid lubricant pigments at high temperatures. A lubricant pigment is defined as a dry, solid, material which provides lubrication between two relatively moving surfaces. A solid lubricant composition is defined as the mixture of solid lubricant pigments, binder, additives, etc., which is applied to the surface to be lubricated.

There are a number of solid lubricant pigments which are well known in the art. Examples of such lubricants are molybdenum disulfide, molybdenum diselenide, graphite, antimony trioxide, tungsten disulfide and tungsten diselenide. It is also well known in the art that such solid lubricants can be mixed with binders such as phenolic, epoxy, acrylic, silicone or phenolic-epoxy resins; the binder serving partly to hold the lubricant particles together and partly to improve the adherence of the particles to the metal substrate surface requiring lubrication. The use of such resin bonded solid lubricants has been quite successful at relatively low temperatures but the limited thermal stability of such resins has limited their usefulness in aerospace mechanisms. Specifically, they are not thermally stable above 450° F. In order to improve the thermal stability of solid lubricant compositions ceramics have been suggested as bonding materials. The use of ceramics, however, has not permitted the use of solid lubricant compositions at temperatures in the range of 500°–1000° F. because of the fact that ceramics become hard, brittle, and abrasive at such temperatures.

OBJECTS

It is, therefore, an object of this invention to provide lubricant compositions comprising a powdered solid lubricant pigment and a suitable binder which is adapted for satisfactory long term use in the temperature range of 500°–1000° F. for many applications where operation is now, at best, marginal with the presently used organic resin and inorganic bonded solid film lubricants.

It is also an object of the invention to provide a method of applying and preparing a solid film lubricant on a metal surface, said film having superior thermal and oxidative stability at temperatures in excess of 500° F. and having improved friction and wear properties at ambient temperatures as well as at elevated temperatures.

It is a further object to provide for the preparation of laminates of bonded solid lubricants with fiber glass, graphitic fibers, and the like to make preformed structures which can be machined to fit against a metal surface to be lubricated.

It is a still further object to provide a lubricant composition useful in the forming of a solid lubricant film with both improved wear life and improved adhesive properties.

SUMMARY OF THE INVENTION

We have now found that the foregoing and related objects can be attained in a solid film lubricant composition which comprises a solid lubricant pigment and a binder therefor; wherein the improvement comprises, as said binder, a member of the group consisting of polybenzothiazole and a polybenzothiazole-zinc oxide reaction mixture. We have found further that the polybenzothiazole can be dissolved in a suitable solvent and can be made into a slurry with the zinc oxide (when used) and the solid lubricant pigment, that the slurry can be applied to a metal surface, that the drying of the slurry can be effected, and the composition can be cured at an elevated temperature. Alternatively, the composition of the invention can be laminated with fiber glass or other suitable, heat stable material to form preformed laminate structures which can be machined to fit against the surface to be lubricated. When zinc oxide is used in either of the foregoing methods it reacts with polybenzothiazole at the curing temperatures.

Polybenzothiazoles can be made, for example, by the reaction of sulfur, mixed toluidines, and 4-aminophthimide. The polybenzothiazoles can be prepared in the manner set forth in U.S. Pat. No. 3,047,543, issued July 31, 1962 to Morton et al. Polybenzothiazoles suitable for use in the composition of the invention have the following structure, where $n$ has a value of at least 2:

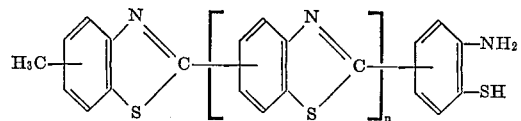

4-aminophthimide has the following structure:

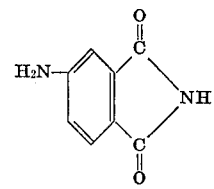

I am not certain of the nature of the reaction which occurs between the zinc oxide and the polybenzothiazole during the curing process and therefore refer to the product as a "reaction mixture." The nature of the latter mixture will vary somewhat with the proportion of the zinc oxide used.

The polybenzothiazole as obtained commercially is usually in bulk or powdered form and usually relatively uncured. It can be dissolved in a suitable solvent such as N-methylpyrrolidine, dimethylacetamide, pyridine, or the like. After preparing a suitable solution (for example, 25% solids) with the dissolved polymer, the solid lubricating material and the zinc oxide (when used) are mixed into the solution by stirring. The proportion of solvent is adjusted to obtain a thin, creamy slurry (about 40–60% solids) which can be sprayed, brushed, dipped, or otherwise applied to a metal substrate surface. A thin uniform coating of approximately 0.0002–0.0005 inch in thickness is most desirable for best results. The slurry on the metal surface is allowed to air dry and the specimen is then placed in a suitable oven for curing of the binder. Curing times and temperatures are selected to complete the evaporation of the solvent at relatively lower temperatures and to complete cross-linking and complete curing of the polymer at relatively higher temperatures. A suitable lower temperature at which the evaporation of the solvent can be completed is at 200° F.. for about one hour. A suitable high temperature for complete curing of the polymer is about 600° F. in an inert atmosphere for about one hour.

I have found that in order to attain improved adhesive properties of lubricant film to a metal surface, to insure adequate bonding of the polymer to the powdered lubricant, and at the same time to maintain low friction and wear the polybenzothiazole should be present in the composition in a proportion of about 25–35 percent by weight of the proportion of solid lubricant pigment. As indicated the reaction of zinc oxide with the polybenzothiazole improves the composition. Although smaller proportions of zinc oxide improve the composition I have found zinc oxide most effective when present in a proportion of about 7 percent of the total composition. Thus I prefer a composition which yields a solid film comprising about 7 percent by weight reacted zinc oxide, and about 20–25 percent reacted polybenzothiazole, and about 68–73 percent solid lubricant pigment.

EXAMPLE I

Powdered polybenzothiazole was dissolved in dimethylacetamide. A mixture of zinc oxide, molybdenum disulfide, and antimony trioxide was added to the solution with stirring until a sprayable mixture was obtained. The resulting composition comprised 25 weight percent polybenzothiazole, 7 percent zinc oxide, and 68 weight percent of the solid lubricant pigment. The resulting slurry was sprayed onto the edge of the disc of a rub shoe tester and the wetted disc was placed in an oven where it was dried at 200° F. for one hour. It was then heated at 600° F. under nitrogen for one hour. The lubricant-coated disc was then placed in the rub shoe tester. In the latter tester a lubricant-coated edge of a disc is rotated between two pressure-loaded shoes. The tests were run at a load of 42 pounds and at a disc speed of 600 r.p.m.'s. The temperature was varied. The folowing was observed (the first four tests being a control run without the presence of zinc oxide):

| Test No.: | Temperature, ° F. | Wear life, load cycles | |
|---|---|---|---|
| 1 | Ambient | 276,114 | No zinc oxide. |
| 2 | do | 329,562 | Do. |
| 3 | 500 | 58,126 | Do. |
| 4 | 500 | 56,314 | Do. |
| 5 | Ambient | 373,286 | With 7% zinc oxide. |
| 6 | do | 398,574 | Do. |
| 7 | 500 | 318,324 | Do. |
| 8 | 500 | 196,368 | Do. |

Because the tests which used a polybenzothiazole-zinc oxide reaction mixture all showed a wear life greater than 100,000 load cycles, showing it to be a very superior binder, I prefer the reaction mixture over polybenzothiazole alone as the binder. However, the above control test results with polybenzothiazole alone are superior to any which can be attained with prior art materials.

EXAMPLE II

The composition of Example I (with and without zinc oxide) was tested in a standard Falex tester. In the latter tester, a lubricant coated, rotating pin rubs against four, lubricant coated pressure points. Failure of the lubricant, or the end of its wear life, is signaled by a rapid rise in torque on the pin. A lubricant is considered not acceptable if it fails to go sixty minutes before the rapid rise in torque. In the test the load was 1,000 pounds, the speed was 290 r.p.m., and the temperature was ambient. In 3 runs where the binder was polybenzothiazole alone (i.e. without zinc oxide) the wear life was 84.3, 98.7, and 108.7 minutes respectively. In 4 runs with a polybenzothiazole-zinc oxide reaction mixture as the binder the wear life was 157.6, 160.6, 184.9 and 199.1 minutes respectively.

The composition of the invention is expected to find maximum utility, when used in areospace mechanisms, particularly in high speed aircraft parts which reach high temperatures due to aerodynamic friction.

It is to be understood that while specific examples describe preferred embodiments of my invention, they are for the purpose of illustration only, that the products and methods of the invention are not limited to the precise details and conditions disclosed, and that various changes may be made therein without departing from the spirit of the invention which is defined by the following claims.

I claim:

1. In a composition which comprises a solid lubricant pigment selected from the group consisting of heavy metal disulfides, heavy metal diselenides, antimony trioxide, and graphite and a binder therefor; the improvement which comprises, as said binder, a member of the group consisting of polybenzothiazole and a polybenzothiazole-zinc oxide reaction mixture.

2. The improvement according to claim 1 wherein said solid lubricant pigment is molybdenum disulfide and antimony trioxide.

3. The improvement according to claim 1 wherein said member is polybenzothiazole.

4. The improvement according to claim 1 wherein said member is a polybenzothiazole-zinc oxide reaction mixture.

5. The improvement according to claim 1 wherein the polybenzothiazole is in a proportion of about 25–35 percent by weight of said solid lubricant.

6. The improvement according to claim 1 wherein said member comprises about 7 percent by weight zinc oxide and about 20–25 percent by weight polybenzothiazole as said reaction mixture.

7. The improvement according to claim 1 wherein said polybenzothiazole is in solution in a suitable solvent and said composition is in the form of a slurry.

8. The improvement according to claim 1 wherein said composition is in the form of a film.

9. The improvement according to claim 8 wherein the method of forming said film comprises the steps of:
   (1) dissolving polybenzothiazole in a suitable solvent;
   (2) forming a slurry with the resulting solution and a mixture of zinc oxide and a solid lubricant;
   (3) applying said slurry to the surface to be lubricated;
   (4) effecting the drying of said slurry; and
   (5) heating the resulting composition to cure said polybenzothiazole and to effect a reaction between said polybenzothiazole and said zinc oxide.

10. The method according to claim 9 wherein said slurry is air dried, then heated to about 200° F. for about one hour, and then to about 600° F. for about one hour to complete said curing and to effect said reaction.

References Cited

UNITED STATES PATENTS 2,703,768 3/1955 Hall ---------------- 252—25
3,314,885 4/1967 Murphy ------------ 252—25

DANIEL E. WYMAN, Primary Examiner
I. VAUGHN, Assistant Examiner

U.S. Cl. X.R.
252—47, 46.4, 29